(12) United States Patent
Buttle et al.

(10) Patent No.: US 8,316,726 B2
(45) Date of Patent: Nov. 27, 2012

(54) BIAXIAL STRESS MANAGEMENT

(75) Inventors: David John Buttle, Wantage (GB); John McCarthy, Wantage (GB)

(73) Assignee: Maps Technology Limited (GB)

( * ) Notice: Subject to any disclaimer, the term of this patent is extended or adjusted under 35 U.S.C. 154(b) by 162 days.

(21) Appl. No.: 12/678,342

(22) PCT Filed: Sep. 24, 2008

(86) PCT No.: PCT/GB2008/050854
§ 371 (c)(1),
(2), (4) Date: May 18, 2010

(87) PCT Pub. No.: WO2009/040575
PCT Pub. Date: Apr. 2, 2009

(65) Prior Publication Data
US 2010/0236339 A1 Sep. 23, 2010

(30) Foreign Application Priority Data
Sep. 24, 2007 (GB) .................................. 0718525.9

(51) Int. Cl.
*G01L 1/12* (2006.01)
(52) U.S. Cl. ...................................... 73/862.69; 324/209
(58) Field of Classification Search ............... 73/779, 73/862.69; 324/209
See application file for complete search history.

(56) References Cited

U.S. PATENT DOCUMENTS

| | | | | |
|---|---|---|---|---|
| 3,958,450 A * | 5/1976 | Kleesattel | ......................... | 73/573 |
| 4,033,182 A * | 7/1977 | Clotfelter | ......................... | 73/597 |
| 4,490,252 A * | 12/1984 | Brigante | ......................... | 210/222 |
| 5,195,377 A | 3/1993 | Garshelis | | |
| 5,828,211 A * | 10/1998 | Scruby et al. | ................. | 324/209 |
| 6,850,055 B2 * | 2/2005 | Buttle | ........................... | 324/209 |
| 6,964,202 B2 * | 11/2005 | Buttle et al. | .................... | 73/799 |
| 7,053,606 B2 * | 5/2006 | Buttle et al. | .................. | 324/217 |
| 7,215,117 B2 * | 5/2007 | Buttle | ........................... | 324/209 |
| 7,876,096 B2 * | 1/2011 | Buttle et al. | .................. | 324/240 |
| 2005/0001612 A1 | 1/2005 | Buttle | | |
| 2008/0221810 A1 | 9/2008 | Bulte | | |
| 2009/0015249 A1 * | 1/2009 | Buttle et al. | .................. | 324/240 |

FOREIGN PATENT DOCUMENTS

| | | |
|---|---|---|
| AT | 355838 | 8/1979 |
| FR | 2378270 | 8/1978 |
| WO | 9924803 | 5/1999 |

* cited by examiner

*Primary Examiner* — Max Noori
(74) *Attorney, Agent, or Firm* — Hartman Global IP Law; Gary M. Hartman; Domenica N. S. Hartman

(57) ABSTRACT

A method of measuring biaxial stress in an object of a ferromagnetic material in which material in a region (10) in the vicinity of a surface of the object is subjected to a conditioning method by application of a conditioning magnetic field that is at least initially at a high field strength. Values of biaxial stress within the said region are measured with an electromagnetic measuring probe (14) in at least two different orientations, the electromagnetic measuring probe (14) using an alternating measuring magnetic field that is at a field strength well below saturation. The conditioning may subject the region (10) to a low frequency alternating magnetic field (38, 58) initially at a high field strength, and gradually reducing the strength to zero over a decay time period at least equal to the time for many cycles of the low frequency magnetic field. Conditioning the material enables the stress to then be measured more accurately, and enables ambiguities in biaxial stress to be resolved.

13 Claims, 3 Drawing Sheets

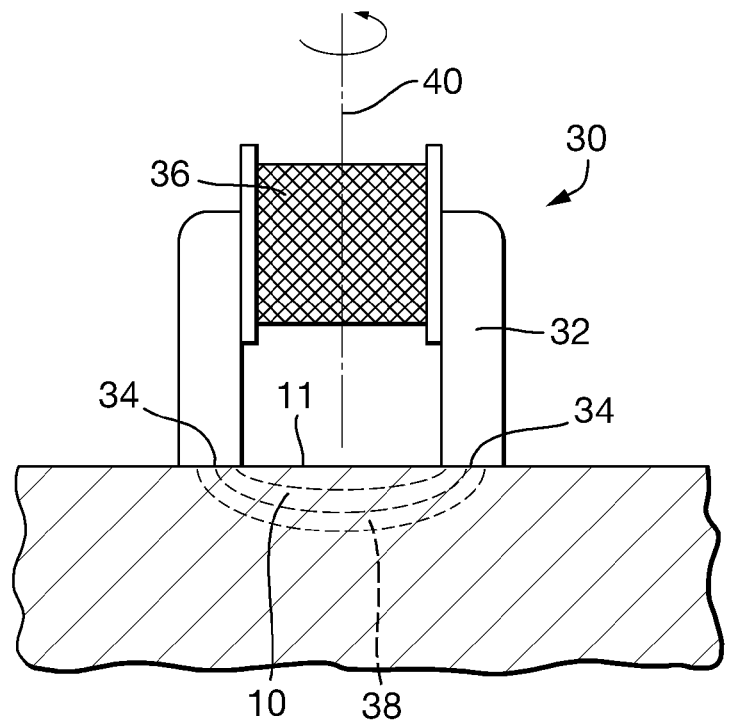
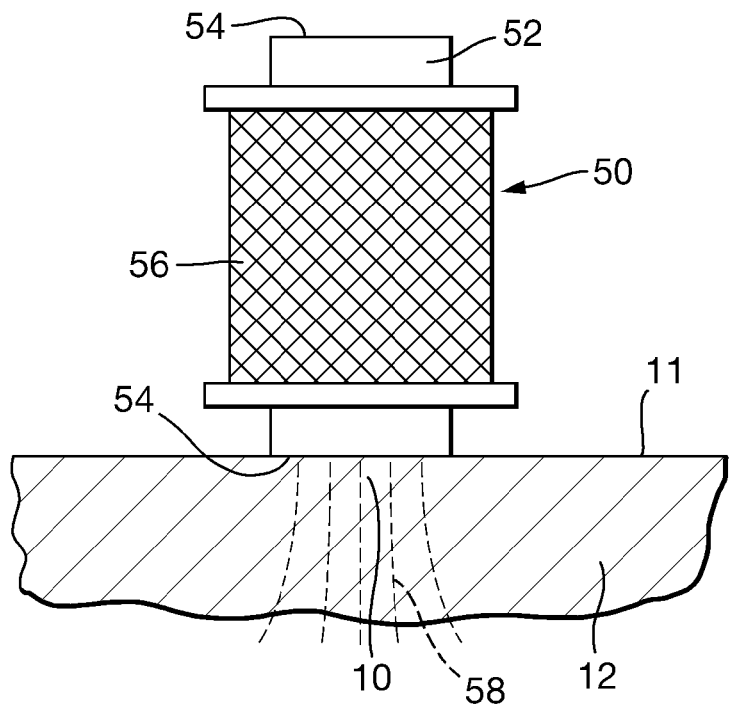

BIAXIAL STRESS MANAGEMENT

This invention relates to a method and apparatus for conditioning a ferromagnetic material, prior to measuring properties of the material using an electromagnetic probe, for example for measuring stress; and it relates to a method and apparatus for measuring biaxial stress of a ferromagnetic material.

The stresses in structures such as rails, bridges and pipelines, complex mechanisms such as vehicles and machinery, or simple devices such as struts, cables or bearings arise from various causes including changes of temperature, and the loads and pressures due to use. There may also be residual stresses arising from the fabrication of the structure or device, and any bending that the structure or device was subjected to during construction; the residual stresses arising from fabrication will also be affected by any stress-relieving heat treatment. In some situations (such as pipelines) the principal stress directions can be expected to be in particular directions (circumferential and longitudinal), whereas in other situations the stress directions are also unknown. A variety of magnetic techniques are known to have some sensitivity to stress, although magnetic measurements are usually also affected by other material properties such as microstructure. A way of measuring stress in a steel plate is described in GB 2 278 450, this method using a probe containing an electromagnetic core with two spaced-apart poles to generate an alternating magnetic field in the plate, and then combining measurements from two sensors, one being a measure of stress-induced magnetic anisotropy, and the other being a measure of directional effective permeability (DEP). Such electromagnetic measurements are affected not only by material properties, but also by geometrical factors, in particular the lift off from the surface (i.e. the gap between the probe and the surface). Different ways of eliminating the effect of lift off are described in GB 2 278 450 and in WO 03/034054, the latter describing both a graphical and an algebraic procedure.

Nevertheless, even after taking geometrical parameters such as lift-off into account, with some magnetic materials the previous magnetic history of the object may still have an effect on the electromagnetic measurements, due to hysteresis. Furthermore with some magnetic materials there may be an ambiguity in the deduced value of biaxial stress.

According to the present invention there is provided a method of measuring biaxial stress in an object of a ferromagnetic material, the method comprising subjecting material in a region in the vicinity of a surface of the object to a conditioning method by application of a conditioning magnetic field that is at least initially at a high field strength; and then measuring values of biaxial stress within the said region by taking measurements with an electromagnetic measuring probe in at least two different orientations, wherein the electromagnetic probe uses an alternating measuring magnetic field that is at a field strength well below saturation.

The conditioning method effectively eliminates the effects of any previous magnetic history of the object, that is to say hysteresis effects, so that the subsequent stress measurements are more accurate. The magnetic field used by the electromagnetic probe when taking measurements is preferably such that the flux density in the material is less than 20% of the saturation flux density, more preferably less than 15%, and still more preferably less than 10% of the saturation the flux density.

In a preferred aspect, the conditioning method comprises subjecting the region to a low frequency alternating magnetic field initially at a high field strength, and gradually reducing the alternating magnetic field strength to zero over a decay time period at least equal to the time for many cycles of the alternating magnetic field, wherein the direction of the magnetic field is either substantially orthogonal to the surface, or substantially parallel to the surface within the region.

Ideally the initial magnetic field strength in the conditioning method should be sufficient for magnetic saturation within the material, but it will be appreciated that in some situations it may not be practicable to obtain magnetic saturation; the closer the initial magnetic field strength is to saturation the more effective the conditioning process will be. Typically the initial magnetic field strength should be such that the flux density is greater than 50% of the saturation flux density, and more preferably greater than 65%.

Preferably, in the case where the magnetic field is substantially parallel to the surface, the conditioning method also comprises rotating the direction of the magnetic field at such a rate that it rotates through several complete revolutions during the decay time period. This rotation is desirable, but not essential; for example in an alternative approach the conditioning might be carried out firstly with a magnetic field in one fixed direction (substantially parallel to the surface), and then repeated with a magnetic field in an orthogonal fixed direction (substantially parallel to the surface).

The conditioning method is primarily for use prior to measuring properties of the material in the region using an electromagnetic probe. Such a probe would contact the surface over a contact area, and it will be appreciated that the region in which the material is conditioned should be at least as large an area as that contact area. Furthermore the electromagnetic probe uses an alternating magnetic field, which might be referred to as a measurement field, at a frequency selected to achieve a desired penetration depth below the surface; and the low-frequency magnetic field used for conditioning the material is preferably at a lower frequency than this measurement field. Preferably the conditioning frequency is no greater than the frequency of the measurement field, and preferably is less by a factor of at least 2 and more preferably at least 10 than the frequency of the measurement field, to ensure that the conditioning takes place to at least the same depth as the subsequent measurement. In the case where the direction of the magnetic field is rotated, preferably this direction is rotated through at least six revolutions during the decay time period.

The conditioning method does not remove all remanent magnetic fields from the body itself, but it arranges the magnetic domains into a consistent distribution, so that the magnetic properties are substantially independent of its previous magnetic history (removing the effects of hysteresis), and are preferably isotropic in a plane parallel to the surface (the X-Y plane) within the region.

The conditioning method provides two alternative approaches: one in which the magnetic field is substantially orthogonal to the surface, and one in which the magnetic field is substantially parallel to the surface. With some ferromagnetic materials the relationship between the biaxial stress and the magnetic measurements taken with the electromagnetic probe depends on which of these alternative conditioning methods is carried out prior to the measurements. Indeed, by carrying out one of the conditioning methods, and then taking a first measurement with the probe, and then carrying out the other conditioning method, and then taking a second measurement with the probe, any ambiguity in the value of the material property so determined may be resolved by using the results of the two measurements. This presumes that calibration has also been performed in association with both these conditioning methods.

In an alternative approach, with some materials, ambiguities in the material property may be resolved by obtaining measurements at two different values of the measurement field. For example a first set of measurements might be taken with the measurement field such that the flux density is 20% of saturation in the material, and a second set taken with the measurement field such that the flux density is 10% of saturation in material. Again this presumes that calibration has also been performed with the two values of measurement field.

In the case where the conditioning method uses a magnetic field substantially parallel to the surface, this magnetic field may be created by using an electromagnet defining two spaced-apart poles adjacent to the surface. In this case the rotation of the conditioning magnetic field may be brought about by rotating the electromagnet about an axis orthogonal to the surface. In an alternative arrangement, the magnetic field is created using an electromagnet defining at least four spaced-apart poles in a circular array adjacent to the surface, and the rotation of the magnetic field can be brought about without moving the electromagnet by adjusting the relative magnitudes of the alternating magnetic fields from opposed pairs of poles.

The present invention also provides an apparatus for conditioning material in a region in the vicinity of a surface of an object, so as to perform such a conditioning method in connection with the measurement of the biaxial stress.

The invention will now be further and more particularly described, by way of example only, and with reference to the accompanying drawings, in which:

FIG. 2 shows a cross-sectional view of an electromagnet for conditioning the material of FIG. 1;

FIG. 3 shows a cross sectional view of an alternative electromagnet for conditioning the material of FIG. 1;

Figure 1:
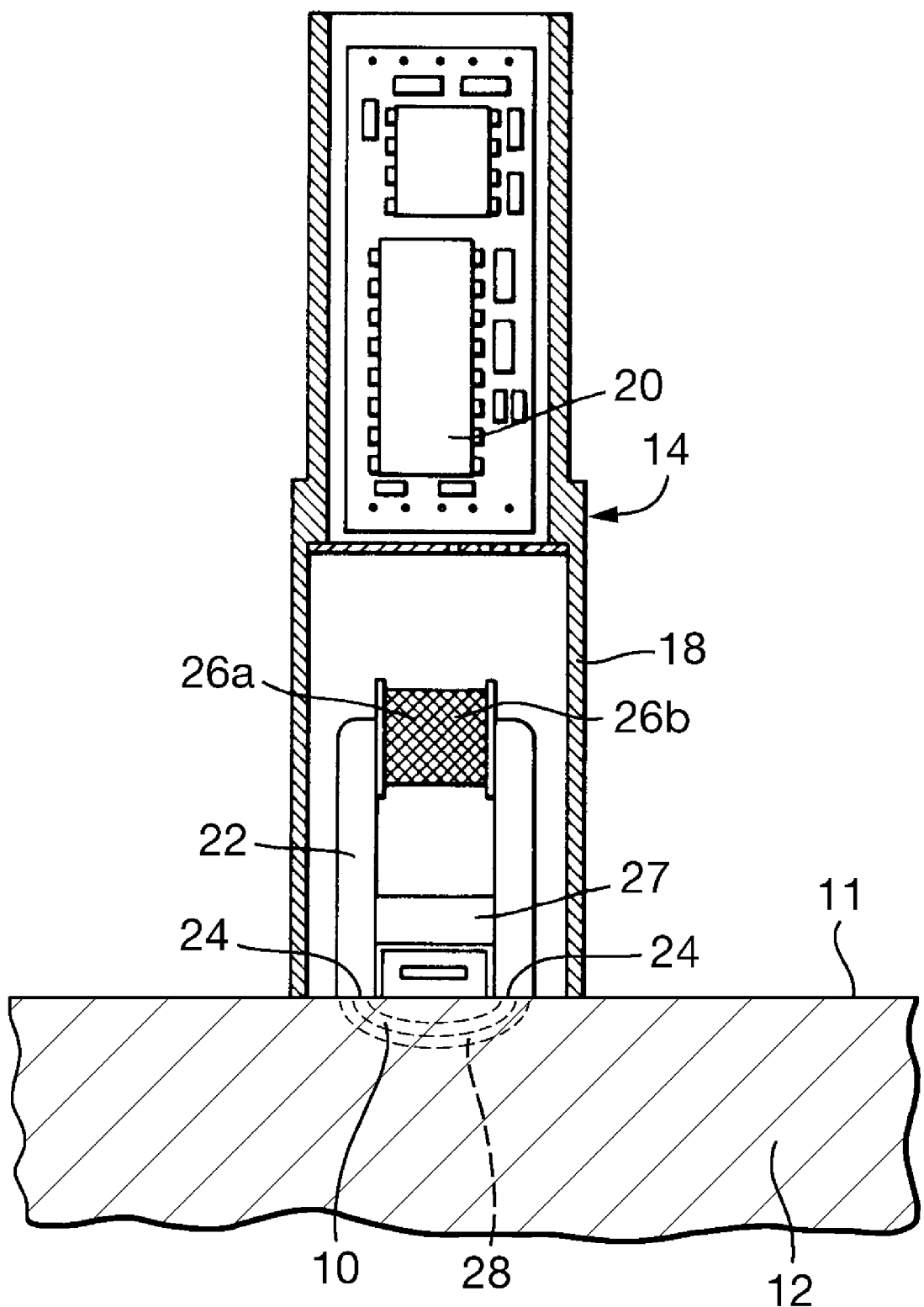
FIG. 1 shows a longitudinal sectional view of a probe for measuring stress in a material.

Referring to FIG. 1, stress within a region 10 near the surface 11 of an object 12 can be measured using a sensor probe 14. The probe 14 comprises a cylindrical brass casing 18 of external diameter 16.5 mm and of overall height 60 mm, the upper half being of reduced diameter whereby the probe 14 is attached to a motor (not shown). The upper half of the casing 18 encloses a head amplifier 20. The lower half encloses a U-core 22 of laminated silicon-steel (a high permeability alloy) whose poles 24 are separated by a gap 7.5 mm wide, and are each of width 2.5 mm, and of thickness 10 mm (out of the plane of the figure). The poles 24 are in the plane of the lower end of the casing 18, which is open. Around the upper end of the U-core 22 is a former on which are wound two superimposed coils 26. One coil 26a (which has 200 turns) is supplied with a sinusoidal drive current from an AC signal supply unit (not shown) such that the alternating magnetic field is considerably less than saturation within the region 10; the other coil 26b (which has 70 turns) provides signals indicative of directional effective permeability (DEP) within the region 10.

Between the two poles 24 is a former on which is wound a 1670-turn rectangular coil 27, about 4 mm high and 6 mm wide, and 6 mm-square as seen from below, the windings lying parallel to the plane of the figure so the longitudinal axis of the coil 27 is perpendicular to the line between the centres of the poles 24. The coil 27 is supported between the arms of the U-core 22 so its lower face is in the plane of the poles 24.

The coil 27 provides a signal indicative of stress-induced magnetic anisotropy (SMA) within the region 10. Both the DEP and the SMA signals are amplified by the head amplifier 20 before transmission to an analysis unit (not shown). There may also be a leakage flux detection coil (not shown) between the poles 24, whose axis is parallel to the line between the centres of the poles 24; this may be on the same former as the coil 27. Typically the signal analysis unit would utilize a microcomputer.

Such a probe is known, for example as described in GB 2 278 450 and in WO 03/034054, as mentioned earlier. When an alternating current, for example of frequency 300 Hz is supplied to the drive coil 26a the magnetic field between the poles 24, indicated diagrammatically by broken lines 28, extends into the object 12 to a depth dependent on the frequency (due to the skin effect). The signals from the sensing coil 26b (which may be referred to as DEP or as linkage signals) may be used to deduce the biaxial (X-Y) stress within the region 10 in both magnitude and direction; the signals from the SMA coil 27 may be used to ascertain the direction of the principal stress axes, or to deduce the difference between the values of stress along the principal stress axes within the region 10; signals from the leakage flux detection coil may also be used to deduce values of biaxial stress.

It will be appreciated that the probe 14 is shown by way of example only. The dimensions of the poles 24 and their separation determines the area of the region 10 within which stress measurements are made, and the measurements are effectively averaged over that region 10. So in some cases, where a high spatial resolution is required, a smaller probe may be used, while in other cases where the spatial resolution is of less significance a larger probe may be used. Probes 14 of overall diameter between about 2 mm and 150 mm have been found suitable for different applications. It will also be appreciated that the skin depth depends upon the drive frequency, varying inversely with the square root of the frequency, so that the frequency at which measurements are made will depend upon the depth below the surface 11 to which the region 10 is to extend. For example the frequency might be selected within the range from say 5 Hz (which in mild steel would give a penetration or skin depth of about 5 mm) up to say 1 MHz (for a penetration of only about 5 μm in mild steel). It will be understood that other features of the probe 14, such as the provision of the casing 18 and of the head amplifier 20, are optional.

Before making such measurements it is beneficial to condition the material within the region 10, and preferably to condition the material over a slightly larger surface area and to a slightly greater depth than the region 10. This may be achieved using a separate conditioning electromagnet 30 as shown in FIG. 2, to which reference is now made. This consists of a U-core 32 of laminated silicon steel (or another ferromagnetic material) whose poles 34 are separated by a gap 13 mm wide, and are each of width 4.0 mm, and of thickness 17 mm (out of the plane of the figure). Around the upper end of the U-core 32 is a former on which is wound a coil 36. In use of the electromagnet 30 it is placed up against the surface 11 at the region 10, and the coil 36 is supplied with a sinusoidal drive current from an AC signal supply unit (not shown) such that the alternating magnetic field in the region 10, indicated by the broken lines 38, is initially at around magnetic saturation. By way of example this alternating magnetic field 38 may be at a frequency of 3 Hz, to provide a penetration of slightly more than 5 mm. The sinusoidal drive current is then gradually reduced to zero over a period of say between 20 and 60 s, for example 30 s, while the electromagnet 30 is rotated about an axis 40 orthogonal to the surface 11 at the centre of the region 10, represented by a chain dotted line; it may for example be rotated once every 4 s. It will be appreciated that the direction of the magnetic field 38 is generally parallel to the surface, particularly within the region 10; and its direction at any one time is substantially parallel to a straight line between the centres of the poles 34.

As an alternative, where a separate conditioning electromagnet 30 is not available, the material within the region 10 can be conditioned using the U-core 22 of the probe 14, placing the probe against the surface 11 at the region 10. The coil 26a is then fed with a sufficiently large sinusoidal drive current to achieve a magnetic field around magnetic saturation within the region 10, this alternating at a low frequency (below the operating frequency when making stress measurements), and the probe 14 is then rotated through several turns about its longitudinal axis as the amplitude of the sinusoidal drive current is gradually reduced to zero, in substantially the same way as described above.

An alternative separate conditioning electromagnet 50 is shown in FIG. 3, to which reference is now made. This consists of a cylindrical core 52 of diameter 16 mm, with poles 54 at opposite ends, around which is a former carrying a coil 56. In use of the electromagnet 50 it is placed up against the surface 11 at the region 10, with a pole 54 on the surface; the coil 56 is then fed with a sufficiently large sinusoidal drive current to achieve a magnetic field around magnetic saturation within the region 10, this alternating at a low frequency below the operating frequency of the sensor probe 14 when making measurements, and the sinusoidal drive current supplied to the coil 56 is then gradually decreased to zero. While the current is flowing the direction of the magnetic field (indicated by the broken lines 58) is generally orthogonal to the surface 11 within the region 10.

It will be appreciated that the conditioning electromagnets 30 and 50 are shown by way of example, and that they are of a size suitable for use in conjunction with the sensor probe 14 as described above, for which the region 10 is about 12.5 mm by 10 mm (these being the dimensions of the rectangle defined by the two poles 24), so that the conditioning magnetic fields 38 and 58 are preferably applied over an area at least as large as this region 10. And it will be appreciated that the frequencies of the sinusoidal drive current used during conditioning may be different from the value mentioned above, although it is preferably lower than the frequency at which the stress measurements are to be made with the probe, to ensure that the skin depth at the conditioning frequency is greater than the skin depth at the stress measuring frequency. The time over which the drive current is reduced to zero should be equivalent to many cycles of the sinusoidal drive current, preferably at least 50 cycles; but it is generally inconvenient if this time is more than about 2 minutes. And in the case where the conditioning is carried out with rotation of the magnetic field direction, the rate of rotation should be many times less than the frequency of the drive current.

In a further modification for the rotating field conditioning method, an electromagnet with say four or six poles equally spaced around a circle may be used, and in this case the rotation of the field may be brought about either by mechanical rotation of the electromagnet or by gradually changing the currents applied to coils associated with each of the poles or with pairs of opposite poles while leaving the electromagnet stationary.

The cores for the conditioning electromagnets may be of laminated soft magnetic material such as silicon steel, sintered particulate iron alloys such as ferrite, amorphous ferromagnetic alloy or nickel/iron/copper alloys such as mu-metal. When dealing with high frequency systems, for example if the drive current for conditioning is at a frequency above 1 kHz, then the core might be of ferrite material.

For many ferromagnetic materials the effect of conditioning the material within the region 10 will be the same whether the conditioning is carried out with a magnetic field 38 generally parallel to the surface (while rotating the direction of the magnetic field), or with a magnetic field 58 generally orthogonal to the surface. But for some materials the relationship between the biaxial stress and the magnetic measurements as taken with the probe 14 will be different according to which conditioning method has been followed. In such cases therefore by performing one of these conditioning methods and taking measurements with the probe 14, and then performing the other conditioning method and again taking measurements with the probe 14, the resulting measurements may enable ambiguities in the biaxial stress to be resolved.

Figure 4:
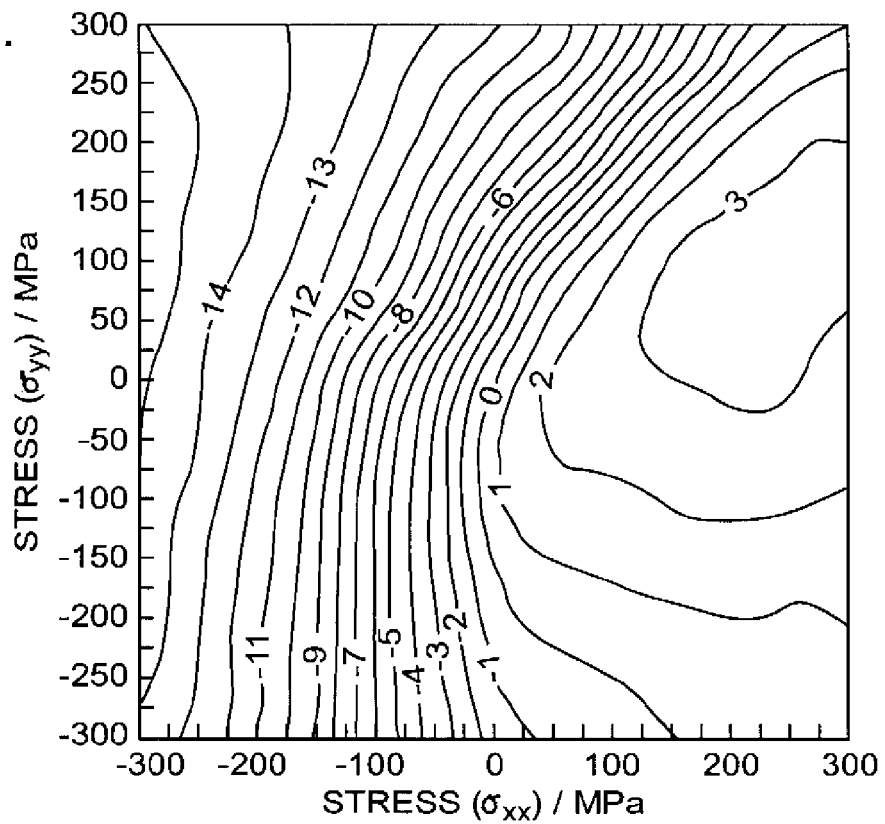
FIG. 4 shows graphically experimental measurements of the variation of a probe signal with biaxial stresses, with the probe aligned parallel to a principal stress axis.
Figure 5:
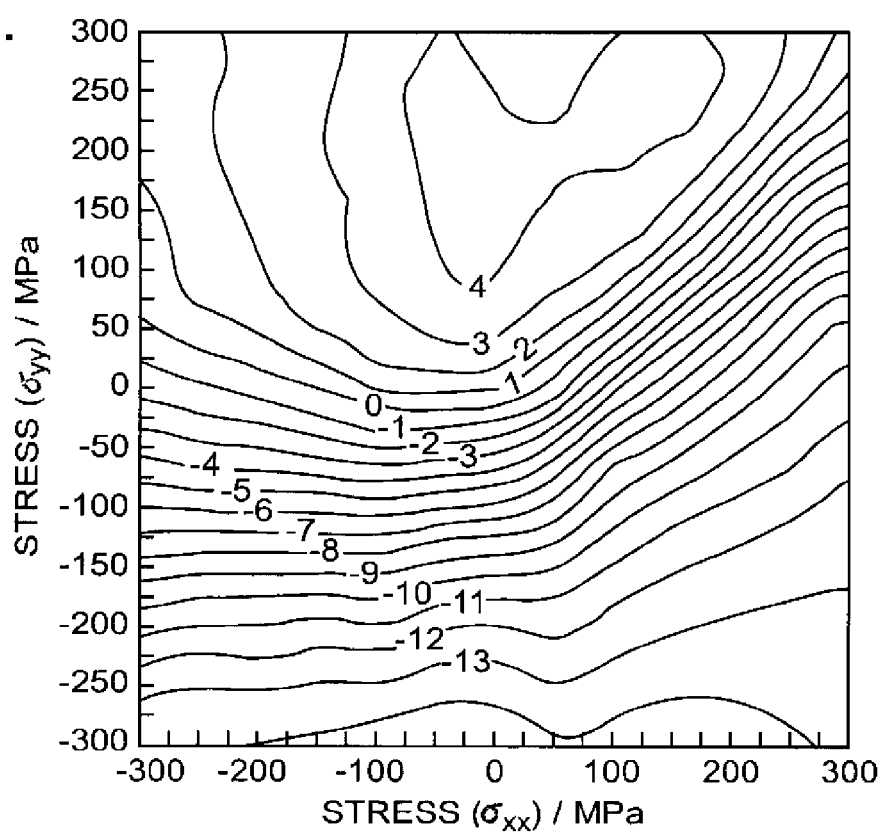
FIG. 5 shows graphically experimental measurements of the variation of the probe signal with biaxial stresses, with the probe aligned parallel to the other principal stress axis.

Referring to FIGS. 4 and 5, which were previously disclosed in GB 2 278 450 B, these indicate by contours experimentally measured values of DEP, that is to say a flux linkage parameter, obtained using a probe similar to that of FIG. 1. FIG. 4 shows the DEP values on the principal stress axis closest to the x-axis of a calibration sample, while FIG. 5 shows the DEP values on the principal stress axis closest to the y-axis of the sample. These values were obtained on a calibration sample that was a steel plate, and was subjected to a wide range of tensile and compressive stresses (G) parallel to the x and y axes of the sample during a calibration procedure.

It will be appreciated that, ideally, it should be possible to determine the biaxial stresses in the object from measured values of just these two DEP parameters, by considering where the corresponding contours in the calibration graphs intersect in the stress plane. Experimental contours are shown for several different integer values of DEP, and corresponding contours for any other value may be obtained by interpolation. Thus with the probe placed on the surface of an object 12, measurements of DEP are made with the probe aligned with the two principal stress axes; the measured value with the probe aligned with one principal stress axis, say the x-axis, corresponds to a contour in the calibration graph of FIG. 4, while the measured value with the probe aligned with the other principal stress axis corresponds to a contour in the calibration graph of FIG. 5. As discussed in GB 2 278 450 B a third set of such contours can also be obtained using an SMA sensor, and this may enable the uncertainty in the deduced biaxial stresses to be reduced.

Nevertheless for some materials there may be regions of the stress plane where there is an ambiguity. For example, with reference to the calibration graphs of FIG. 4 and FIG. 5, in the quadrant where the stresses along the principal stress axes are both compressive (which are negative values) then the corresponding calibration contours on FIG. 4 are approximately perpendicular to those on FIG. 5, so the values of biaxial stress where any two contours intersect is well-defined; but in at least part of the quadrant where the stresses along the principal stress axes are both tensile (which are positive values) the corresponding calibration contours are approximately parallel to each other, so there may be situations where the corresponding contours intersect at more than one position in the stress plane. There would therefore be ambiguity about the biaxial stress.

It has been found that if the material is conditioned in one of the described ways, the resulting measurements, for example of DEP, are slightly different from those obtained if the material is conditioned in another one of the described ways. Consequently by first conditioning by one method, and measuring the values of the measured parameter, say DEP, and then conditioning by the other method, and measuring the values of the experimental parameter again, this ambiguity of biaxial stress may be eliminated.

As mentioned above the conditioning may be carried out using the electromagnet within the probe 14. By the same token, if the conditioning is carried out using a four-pole electromagnet as described above, the stress measurements may also be made with the same four-pole electromagnet. This avoids the need to turn the probe to take measurements at different orientations of the magnetic field, as the direction of the magnetic field can be changed by changing the relative magnitudes of the drive currents associated with opposite pairs of poles. Each pair of opposite poles would be provided with a sensor coil for flux linkage. At the centre of such a four-pole electromagnet would typically be a former carrying two sets of sensor windings in orthogonal directions: in relation to one pair of opposite poles one of these windings would indicate SMA and the other winding would indicate flux leakage, and vice versa for the other pair of opposite poles. For intermediate directions of the magnetic field, the corresponding values of SMA and flux leakage can be deduced by combining signals from these two windings, and the corresponding value of flux linkage can be deduced from the signals from the two flux linkage windings.

As mentioned above a probe such as the sensor probe 14 may be used to obtain measurements indicative of stress. This has a wide range of potential applications, and in some of these applications material conditioning is also desirable before the measurements are made. Some examples are as follows.

EXAMPLE 1

After an object has been welded together, it may be subjected to a post-weld heat treatment to ensure that residual stresses have been eliminated. This heat treatment may for example involve heating the object to about 500° C., leaving it at this temperature for an hour, and then gradually cooling back to ambient temperature. The effectiveness of the treatment can then be assessed by using taking measurements with such a sensor probe along a line transverse to the line of the weld, and detecting any significant variability in the magnetic data. In this context the actual values of stress need not necessarily be determined, as it may be sufficient to identify if the stress is approximately uniform.

EXAMPLE 2

After performing shot-peening with the aim of introducing compressive stresses within a surface layer, the stress distribution may be ascertained by using such a sensor probe and making measurements at several different frequencies, and hence with different depths of penetration. The stress variation with depth can then be deduced, for example using the analysis approach described in U.S. Pat. No. 6,850,055 (Buttle). This enables the thickness of the layer that is under compression to be determined. If the intention is only to determine this thickness, the actual values of stress need not necessarily be determined.

EXAMPLE 3

The load in a bolt may be determined by making measurements of the stress, using such a sensor probe, and its variation across the top of the bolt, or by measuring the stress at the side of the head.

EXAMPLE 4

Thermally-induced stresses in a rail of a railway line can be determined using such a sensor probe. The probe is used measure the stresses in the rail in the vertical direction and in the direction parallel to the longitudinal axis. The residual stress in the longitudinal direction can be deduced from the measured stress in the vertical direction, and hence the thermally-induced stress can be determined, as described in WO 2004/077003 (Buttle et al/AEA Technology). The measurements may be improved by performing material conditioning as described above.

As described above the conditioning may be carried out using a conditioning field whose magnetic flux is either orthogonal to or parallel to the surface, this being an alternating field gradually reduced to zero. In a modification the conditioning process might also involve simultaneous application of a constant magnetic field, for example being provided by a DC current. This is not usually convenient if the magnetic field is parallel to the surface, but can conveniently be applied in the case where the conditioning magnetic flux is orthogonal to the surface. Indeed conditioning may be carried out using a range of different constant magnetic fields in the Z-direction, so providing a range of different conditioned states in each of which the magnetic properties are substantially isotropic in the X-Y plane but differ in the Z direction.

Performing a range of different conditioning processes enables more information to be obtained about the stress state within the region in which measurements are subsequently made. This may be used to eliminate ambiguities in the measured biaxial stress, but in principle may also be used to deduce triaxial stress. For this purpose the measurements must be taken at several different frequencies (and hence with different penetration depths), followed by deconvolution to deduce magnetic properties at different depths below the surface. It may be assumed that the third principal stress axis is orthogonal to the surface; and this third stress component must be zero at a free surface. For example, as described in U.S. Pat. No. 6,850,055 (Buttle), the measurements of material property may be deconvolved by assuming a functional form for the variation of material property with depth. The measurements of magnetic properties at different depths, carried out with several different conditioning processes, provides data from which the triaxial stress can be ascertained at different depths.

In yet another alternative, conditioning might be carried out using only a constant (DC) magnetic field. This might be applied in any fixed direction, and indeed might even be applied at the same time as measurements are made. This approach does not generally produce isotropic properties in the X-Y plane, but may nevertheless produce consistent magnetic properties.

The invention claimed is:

1. A method of measuring biaxial stress in an object of a ferromagnetic material, the method comprising:
  (a) subjecting material in a region (10) in the vicinity of a surface (11) of the object to a conditioning method by application of a conditioning magnetic field (38) that is at least initially at a high field strength; and then
  (b) measuring values of biaxial stress within the said region by taking measurements with an electromagnetic measuring probe (14) in at least two different orientations, wherein the electromagnetic measuring probe (14) uses an alternating measuring magnetic field (28) that is at a field strength well below saturation; wherein the conditioning method comprises subjecting the region to a low frequency alternating magnetic field (38) initially at a high field strength, and gradually reducing the alternating magnetic field strength to zero over a decay time period at least equal to the time for many cycles of the alternating magnetic field, wherein the direction of the magnetic field is either substantially orthogonal to the surface (11), or substantially parallel to the surface (11) within the region.

2. A method as recited in claim 1 wherein, in the conditioning method the magnetic field (38) is substantially parallel to the surface, and the method also comprises rotating the direction of the magnetic field at such a rate that it rotates through several complete revolutions during the decay time period.

3. A method as recited in claim 2 wherein the direction rotates through at least six revolutions during the decay time period.

4. A method as recited in claim 1 wherein the low-frequency alternating magnetic field is substantially parallel to the surface and is generated by an electromagnetic core defining at least four poles around a circle.

5. A method as recited in claim 1 wherein the initial high field strength is sufficient for a flux density of at least 50% that at magnetic saturation within the material.

6. A method as recited in claim 1 wherein the electromagnetic measuring probe (14) has spaced-apart poles (24) occupying an area, wherein the conditioning is carried out over a region that is at least as large as the area occupied by the poles (24) of the electromagnetic measuring probe (14).

7. A method as recited claim 1 wherein the conditioning method uses a low frequency alternating magnetic field, and the low-frequency alternating magnetic field used for conditioning the material is at a lower frequency than the measurement field.

8. A method as recited in claim 7 wherein the frequency of the low-frequency magnetic field (38) is less than that of the measurement field (28) by a factor of at least 2 and preferably at least 10.

9. A method as recited in claim 1 wherein the electromagnetic measuring probe (14) is also used to produce a low-frequency alternating magnetic field for conditioning the material.

10. A method as recited in claim 1 wherein ambiguities in the biaxial stress values are resolved by taking measurements under two different measurement circumstances.

11. A method as recited in claim 10 wherein the different measurement circumstances are provided by different field strengths of the measurement magnetic field.

12. A method as recited in claim 10 wherein the different circumstances are provided by performing a method as claimed in any one of the preceding claims at least two times, with conditioning methods that differ from each other.

13. An apparatus for performing a method as recited in claim 1.

* * * * *